US007337764B2

(12) United States Patent
Pringle et al.

(10) Patent No.: US 7,337,764 B2
(45) Date of Patent: Mar. 4, 2008

(54) PRESSURE BALANCED BEARING

(75) Inventors: Hal E. Pringle, Bloomfield, MI (US); Robert D. Keefover, Farmington Hills, MI (US); Michael J. Halsig, Warren, MI (US)

(73) Assignee: BorgWarner Inc., Auburn Hills, MI (US)

( * ) Notice: Subject to any disclaimer, the term of this patent is extended or adjusted under 35 U.S.C. 154(b) by 769 days.

(21) Appl. No.: 10/789,399

(22) Filed: Feb. 27, 2004

(65) Prior Publication Data

US 2004/0241025 A1 Dec. 2, 2004

Related U.S. Application Data

(60) Provisional application No. 60/474,354, filed on May 30, 2003.

(51) Int. Cl.
*F02D 9/08* (2006.01)
*F02D 11/10* (2006.01)
*F16K 1/22* (2006.01)
*F16C 17/00* (2006.01)

(52) U.S. Cl. ...................... 123/337; 123/399; 251/305; 384/309

(58) Field of Classification Search ................ 123/336, 123/337, 361, 399; 251/304–309, 315.01; 384/132, 309–312, 462, 465; 415/1
See application file for complete search history.

(56) References Cited

U.S. PATENT DOCUMENTS

| | | | | |
|---|---|---|---|---|
| 1,731,895 A * | 10/1929 | Gold | .......................... | 384/132 |
| 2,657,943 A * | 11/1953 | Booser et al. | .............. | 384/465 |
| 3,466,478 A * | 9/1969 | Gail | ............................ | 310/90 |
| 3,729,128 A * | 4/1973 | Reed | ........................... | 494/15 |
| 3,984,159 A * | 10/1976 | Jenness | ...................... | 384/310 |
| 6,929,064 B1 * | 8/2005 | Susman | ...................... | 166/105 |
| 6,966,746 B2 * | 11/2005 | Cardenas et al. | .............. | 415/1 |

* cited by examiner

*Primary Examiner*—Willis R. Wolfe, Jr.
(74) *Attorney, Agent, or Firm*—Warn Partners, P.C.

(57) ABSTRACT

A method of pressure balancing across a bearing adjacent to a pressure differential is described. The method primarily includes providing a bypass port around the bearing for allowing a fluid flow from a first pressure side to a second pressure side. A throttle body for an engine is also described. The throttle body primarily includes: (1) a bearing cooperating with the valve body; and (2) a bypass port around the bearing for allowing the fluid flow from a first pressure side to a second pressure side.

65 Claims, 7 Drawing Sheets

PRESSURE BALANCED BEARING

CROSS-REFERENCE TO RELATED APPLICATION

The instant application claims priority to U.S. Provisional Patent Application Ser. No. 60/474,354, filed May 30, 2003, the entire specification of which is expressly incorporated herein by reference.

FIELD OF THE INVENTION

The present invention relates to an apparatus and method for improving bearing life in a bearing that exists in an environment, such as fluid flow metering environments, having a pressure differential or delta, such as those having a high-pressure section and a low-pressure section.

BACKGROUND OF THE INVENTION

In the past, throttle bodies have been used for metering a fluid flow in an internal combustion engine. Typically, these throttle bodies include a butterfly valve member which is rotationally positioned in an intake bore. The valve member is rotationally coupled to the valve body by way of one or more bearings.

Because the valve is positioned in the intake portion of the valve body, a pressure differential or delta exists between the high-pressure side of the butterfly valve and the low-pressure side of the butterfly valve. Also, a pressure differential or delta exists between the inboard side of the shaft bearing that is nearer to the valve than the outboard side of the shaft bearing. The result of these pressure differentials or deltas is that it can force contaminants into the bearing as well as force lubricant out of the bearing.

Typically, it has been attempted to provide an extremely low tolerance seal to reduce these tendencies. However, needing to engineer the seal to such low tolerances increases the cost of the assembly and is typically not effective in reducing the previously described problems with the bearings. These problems are particularly troublesome in turbocharged or boosted engines having higher pressure than normally aspirated engines.

Accordingly, there exists a need for a new and improved fluid flow metering system, and method of operating the same, in order to overcome the aforementioned deficiencies. Additionally, there exists a need for a new and improved throttle body, and method of operating the same, in order to overcome the aforementioned deficiencies. Furthermore, there exists a need for a new and improved bearing system and method of operating the same, in order to overcome the aforementioned deficiencies.

SUMMARY OF THE INVENTION

The present invention preferably provides a method and apparatus that allows pressure balancing across a bearing that is adjacent to a valve in which the bearing has a pressure differential or delta, e.g., a high-pressure side and a low-pressure side axially across its width.

The method of the present invention preferably includes providing a valve body that has a valve on a rotational shaft for metering flow through an intake body or the like. The valve is preferably rotatable on the shaft with respect to the valve body. The shaft is preferably rotationally connected to the valve body by way of a bearing. A bypass port is preferably configured between the bearing and the valve body for allowing a flow across the pressure differential, e.g., from the high-pressure side to the low-pressure side around the bearing.

Allowing the pressure to be balanced on either side of the bearing between the low pressure and high pressure sides preferably provides a passageway for pressure equalization without tendencies for pressure equalization to be through the bearing, which introduces contaminants in the bearing or may force out lubricants from the bearing or both. This invention preferably provides improved bearing life throughout the life of the valve body.

In accordance with a first embodiment of the present invention, a method of pressure balancing across a bearing adjacent to a pressure differential is provided, the pressure differential including a first pressure side on a first side of said bearing and a second pressure side on a second side of said bearing, comprising providing a bypass port around said bearing for allowing a fluid flow from the first pressure side to the second pressure side.

In accordance with a second embodiment of the present invention, a method of pressure balancing across a bearing adjacent to a valve having a high-pressure side on a first side of said bearing and a low-pressure side on a second side of said bearing is provided, comprising: (1) providing a valve body including a valve on a rotational shaft for metering flow by rotating said shaft with respect to said valve body, said shaft being rotationally connected to said valve body by way of a bearing; and (2) providing a bypass port between said bearing and said valve body for allowing a flow from said high-pressure side to said low-pressure side.

In accordance with a third embodiment of the present invention, a method of pressure balancing across a bearing adjacent to a valve having a high-pressure side on a first side of said bearing and a low-pressure side on a second side of said bearing is provided, comprising: (1) providing a valve body including a valve on a rotational shaft for metering flow by rotating said shaft with respect to said valve body, said shaft being rotationally connected to said valve body by way of a bearing; and (2) providing a bypass port between said bearing and said valve body for allowing a flow from said high-pressure side to said low-pressure side; wherein said bypass port communicates to the shaft on a first side of said bearing and on a second side of said bearing.

In accordance with a fourth embodiment of the present invention, a throttle body for an engine is provided, wherein a pressure differential is present in proximity to the throttle body, the pressure differential including a first pressure side and a second pressure side, comprising: (1) a bearing cooperating with said valve body; and (2) a bypass port around said bearing for allowing a fluid flow from the first pressure side to the second pressure side.

In accordance with a fifth embodiment of the present invention, a throttle body for an engine is provided, comprising: (1) a body portion including an air intake portion; (2) a butterfly valve configured to meter air through said air intake portion; said butterfly valve attached to a shaft which is configured to rotate said body portion; said shaft being rotationally coupled with a bearing in said body portion, said bearing being fit into a cavity in said body portion; and (3) surfaces for forming a port bypassing said bearing between a differential pressure zone.

In accordance with a sixth embodiment of the present invention, a throttle body for an engine is provided, comprising: (1) a body portion including an air intake portion; (2) a butterfly valve configured to meter air through said air intake portion; said butterfly valve attached to a shaft which is configured to rotate said body portion; said shaft being rotationally coupled with a bearing in said body portion, said bearing being fit into a cavity in said body portion; and (3) surfaces for forming a port bypassing said bearing between a differential pressure zone; wherein said body portion includes a high-pressure portion on a first side of said body portion and a low-pressure portion on a second side of said body portion in said air intake portion whereby a passage is provided therebetween, wherein said passage communicates with either said high-pressure side or said low-pressure side of said air intake portion.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

The same reference numerals refer to the same parts throughout the various Figures.

DETAILED DESCRIPTION OF THE PREFERRED EMBODIMENTS

Figure 1:
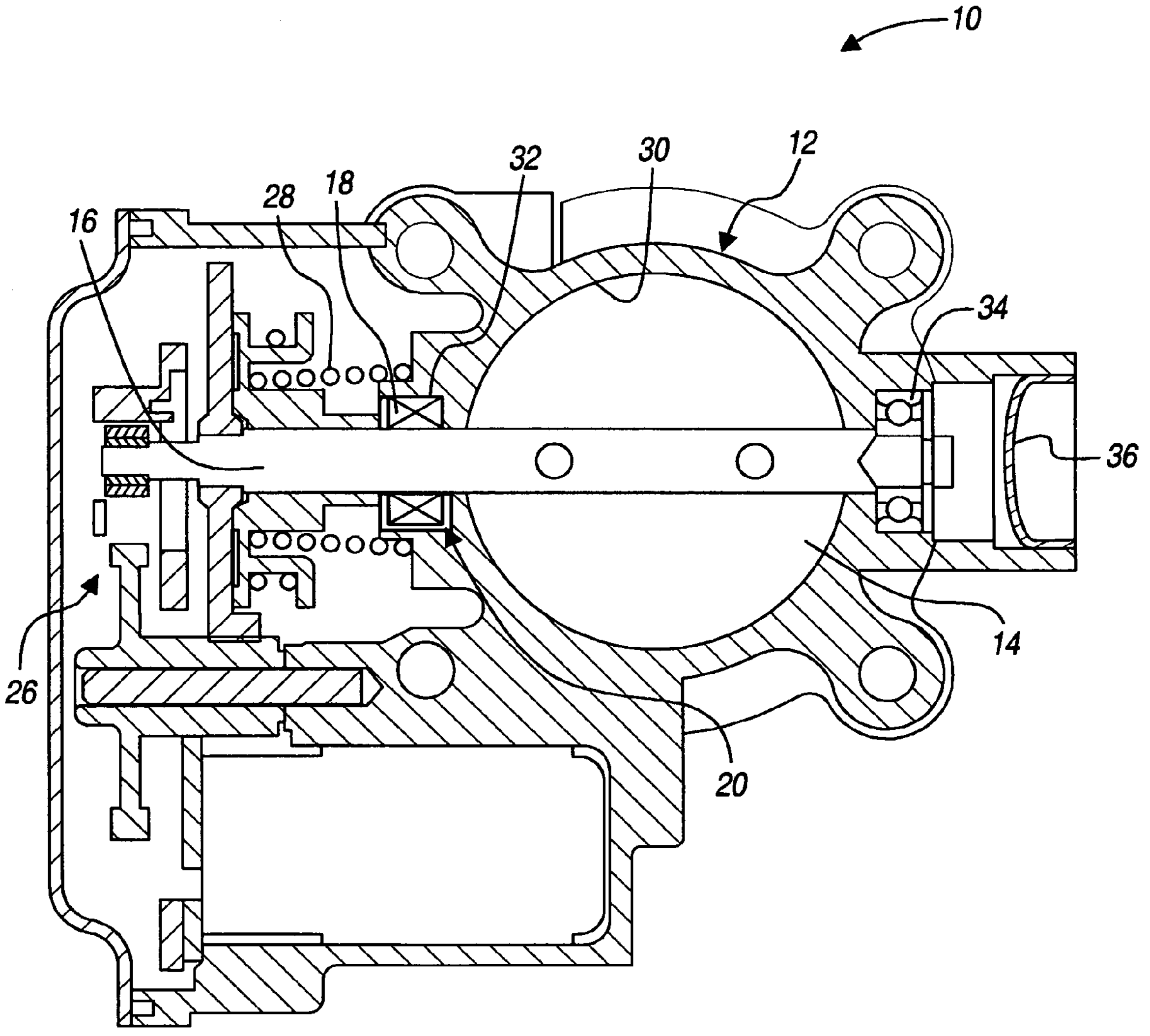
FIG. 1 is a sectional view illustrating a valve body, in accordance with the general teachings of the present invention.
Figure 2:
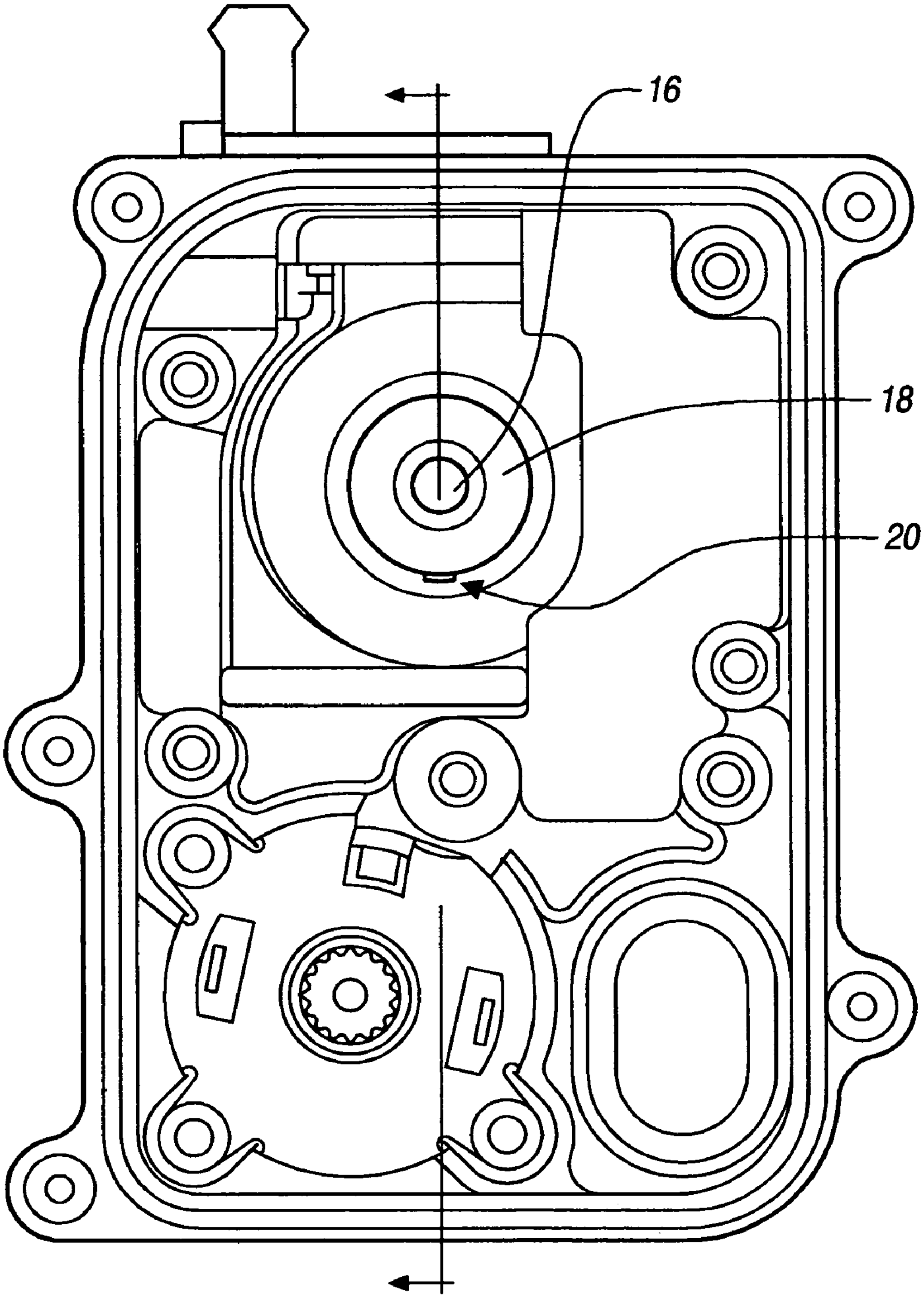
FIG. 2 is a broken away side view illustrating a vacuum bypass, in accordance with the general teachings of the present invention.

The following description of the preferred embodiment(s) is merely exemplary in nature and is in no way intended to limit the invention, its application, or uses.

By way of a non-limiting example, the present invention can be practiced with any type of fluid (e.g., air, gas, liquid and the like) metering system, including but not limited to internal combustion engines.

In accordance with the general teachings of the present invention, a method of pressure balancing across a bearing area is provided. Additionally, a valve body having a pressure balanced bearing system therein is also included in the present invention.

Referring generally to the Figures, a valve body that includes the present invention is generally shown at 10. Shown herein, the invention is preferably used in an illustrative throttle body, generally indicated at 12, of an engine. The engine may be of the internal combustion variety; however, it is envisioned that the present invention with be compatible with other types of engines, as well.

Valve body 10 preferably includes a valve 14 mounted on a selectively rotatable shaft 16. The shaft 16 is preferably rotationally coupled with the throttle body 12 by way of at least one bearing 18.

A bypass port generally indicated at 20 preferably provides a method for allowing a fluid flow across a pressure differential or delta, e.g., from a high-pressure side to a low-pressure side. More preferably, bypass port 20 provides a bypass in the valve body 10 for allowing the flow flow from the high-pressure side of the valve body 10 generally indicated in FIG. 3 at 22 to a low-pressure side 24. Still more preferably, the bypass port 20 preferably provides a bypass in the valve body 10 for allowing the fluid flow from a high-pressure side 22A adjacent the bearing 18 to a low-pressure side 24A adjacent the bearing 18.

Typically, the bypass port 20 aids in the regulation of pressure or vacuum, and is sometimes referred to as a vacuum bypass. The bypass port 20 could also be a pressure bypass or the like and is effectively characterized as a pressure equalization port which provides a path around the bearing 18 for pressure to pass around rather than through the bearing 18.

While the present invention is particularly useful in any throttle body, for instance, it is particularly useful in boosted engines wherein the low-pressure to high-pressure side of the bearing 18 may have a very large delta, which in previous throttle body designs has detrimentally effected the bearing life of the shaft bearing.

As shown in FIG. 1, the throttle body 12 preferably includes a valve actuation side (e.g., control side chamber), generally shown at 26. In this embodiment, the control side chamber 26 includes an electronic throttle control body that preferably includes drive gears or the like, contained in control side chamber 26, and a return spring mechanism generally shown at 28. Valve 14 is preferably in an intake chamber 30 (e.g., bore) in the throttle body 12. It should be appreciated that the present invention can be practiced with open throttle systems, as well as closed throttle systems.

Typically, there is a pressure delta between the intake chamber 30 and the control side chamber 26. This difference in pressure tends to be equalized through the bearings inside of the bearing 18 housing. However, this tends to detrimentally remove lubrication or interpose contaminants into the surface of the bearing 18 or the surface thereof, thereby reducing performance of the shaft 16, regardless of whether a bearing or a bushing is employed.

To avoid this problem, the bypass port 20 (e.g., passage) of the present invention preferably provides an egress on the outside portion 32 of the bearing 18, along the axial direction of the shaft 16. While seals and close tolerances are designed around the shaft 16, axial flow along rotational shaft 16 is still a possibility. The bypass port 20 preferably allows such pressure to bypass the bearing 18 rather than go through the bearing 18. This preferably allows flow between the control side chamber 26 and the intake chamber 30.

Figure 3:
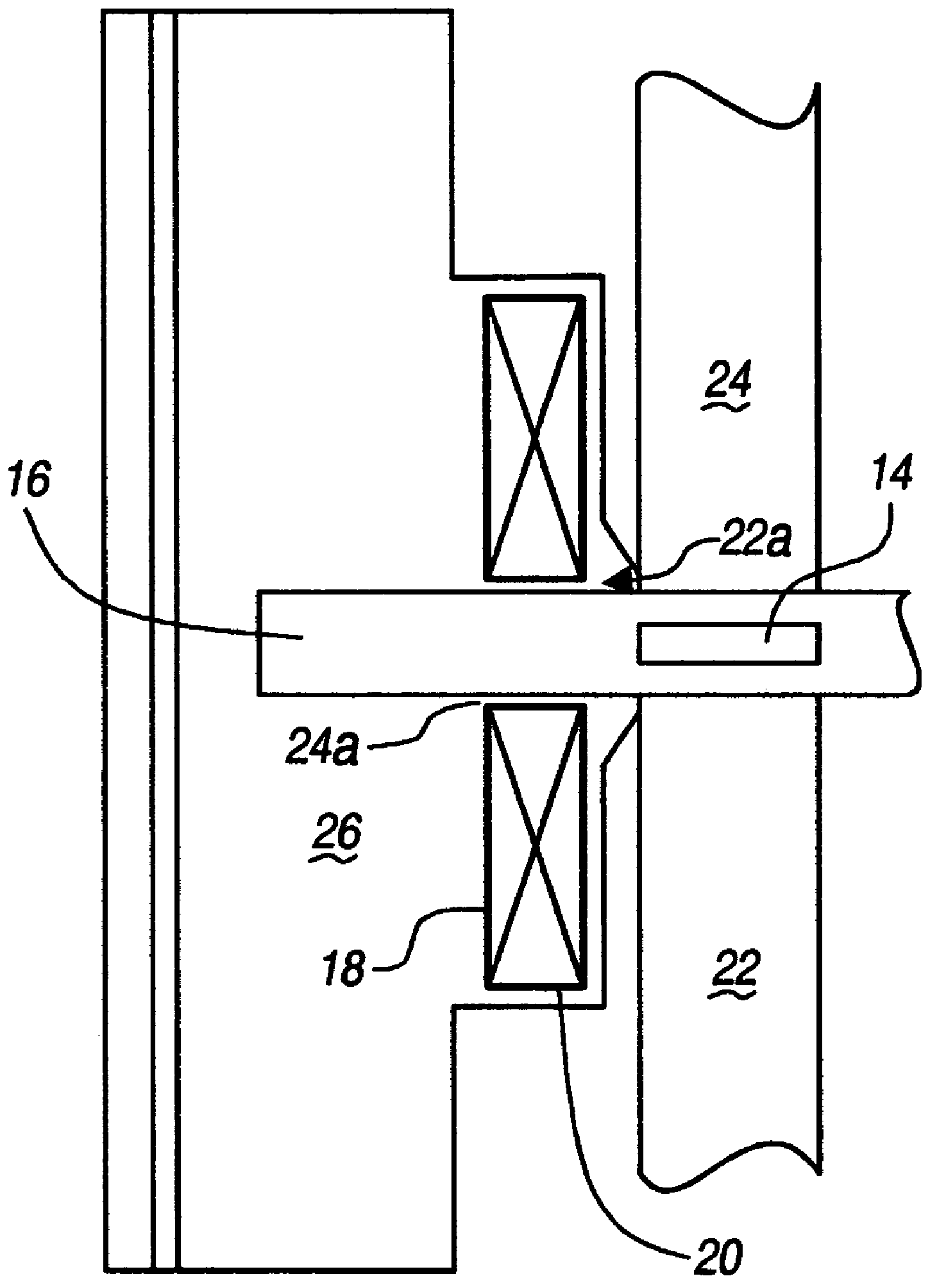
FIG. 3 is a schematic view illustrating a first alternative embodiment of a valve body, in accordance with the general teachings of the present invention.

By way of a non-limiting example, the bypass port 20, as shown in FIG. 3, also preferably communicates with the throttle body 12 such that it provides equalization on either side of the valve 14, to provide equalization along between either the high-pressure 22 side or low-pressure 24 side of the valve body 10, which also reduces any tendency to flow through the bearing 18 during operation. The bypass port 20 also permits pressure equalization between high-pressure side 22A and low-pressure side 24A adjacent bearing 18.

Thus, in the preferred embodiment, the bypass port 20 can either be a "U," "L," or other suitably shaped channel communicating with the shaft 16 on either side of the bearing 18 or, alternatively, the "U," "L," or other suitably shaped bypass port 20 could be in communication with the intake chamber 30 on one of the high-pressure 22 or low-pressure 24 sides. Alternatively, the bypass port 20 can be configured in a straight channel shape.

As shown in the present Figures, a second bearing 34 is preferably provided on the opposite end of the shaft 16 and is sealed in place by the seal 36. Similarly, if desirable, an additional bypass port or channel (not shown) could be used on the opposite side of the shaft 16.

Figure 4A:
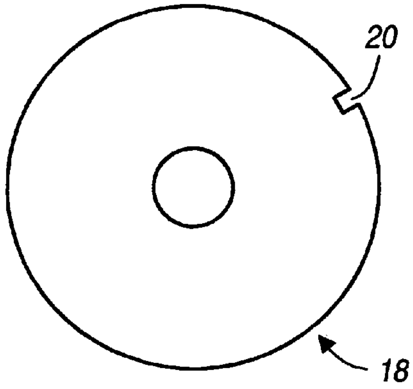
FIG. 4A is an elevational view illustrating a bearing having a bypass port formed on an exterior surface thereof, in accordance with a first alternative embodiment of the present invention.
Figure 4B:
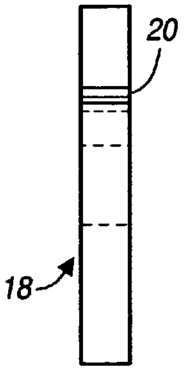
FIG. 4B is a sectional view of the bearing illustrated in FIG. 4A, in accordance with a first alternative embodiment of the present invention.
Figure 4C:
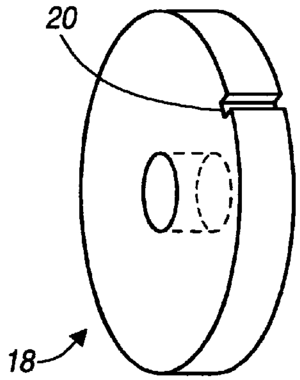
FIG. 4C is a perspective view of the bearing illustrated in FIGS. 4A and 4B, in accordance with a first alternative embodiment of the present invention.
Figure 5A:
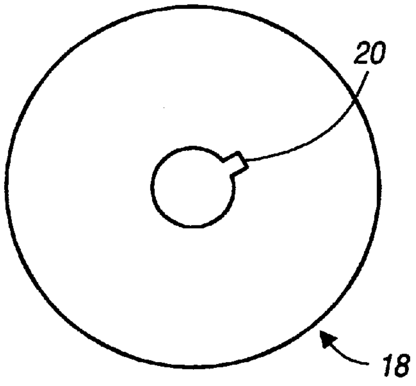
FIG. 5A is an elevational view illustrating a bearing having a bypass port formed on an interior surface thereof, in accordance with a second alternative embodiment of the present invention.
Figure 5B:
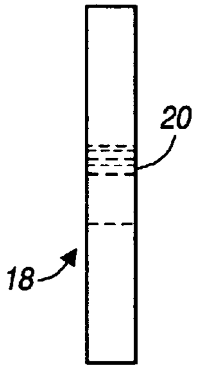
FIG. 5B is a sectional view of the bearing illustrated in FIG. 5A, in accordance with a second alternative embodiment of the present invention.
Figure 5C:
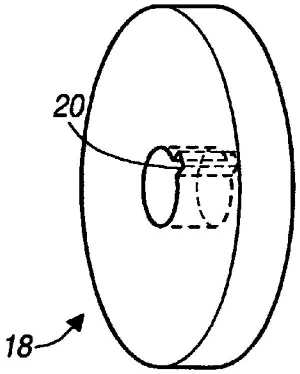
FIG. 5C is a perspective view of the bearing illustrated in FIGS. 5A and 5B, in accordance with a second alternative embodiment of the present invention.

The bypass port 20 is preferably milled into the valve body 10 or molded into the valve body 10 at the bearing location. It should be appreciated that in an alternate embodiment the bypass port 20 could be configured into either an exterior surface (as generally shown in FIGS. 4A-4C) and/or interior surface of the bearing 18 (either milled or molded in), as shown generally in FIGS. 5A-5C.

Figure 6:
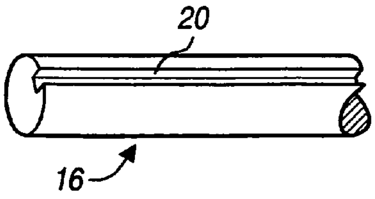
FIG. 6 is a partial perspective view illustrating a shaft having a bypass formed on an exterior surface thereof, in accordance with a third alternative embodiment of the present invention.

In a further alternate embodiment, the bypass port 20 can be configured into a surface (e.g., exterior) of the shaft 16 (either milled or molded in), as generally shown in FIG. 6.

Figure 7A:
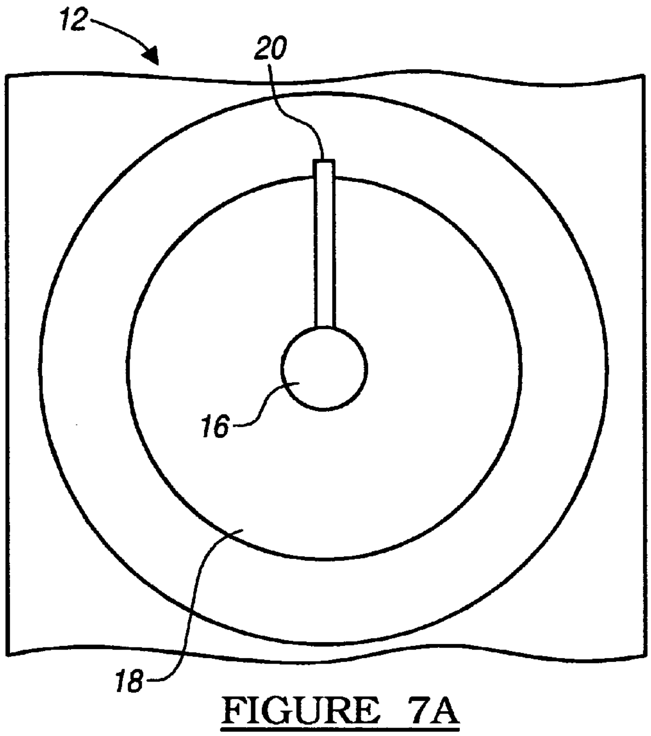
FIG. 7A is an elevational view illustrating a second alternative valve body having a bypass port formed therein, in accordance with a fourth alternative embodiment of the present invention.
Figure 7B:
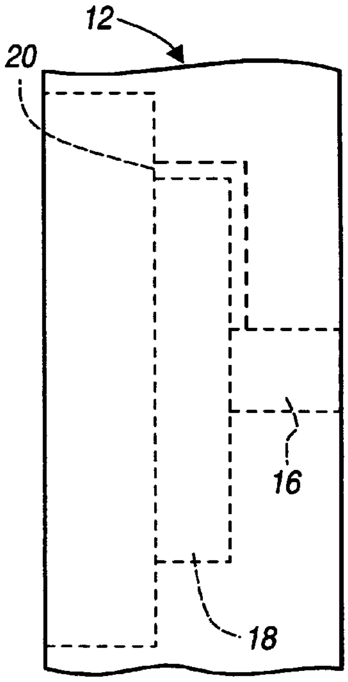
FIG. 7B is a partial sectional view of the second alternative valve body illustrated in FIG. 7A, in accordance with a fourth alternative embodiment of the present invention.
Figure 7C:
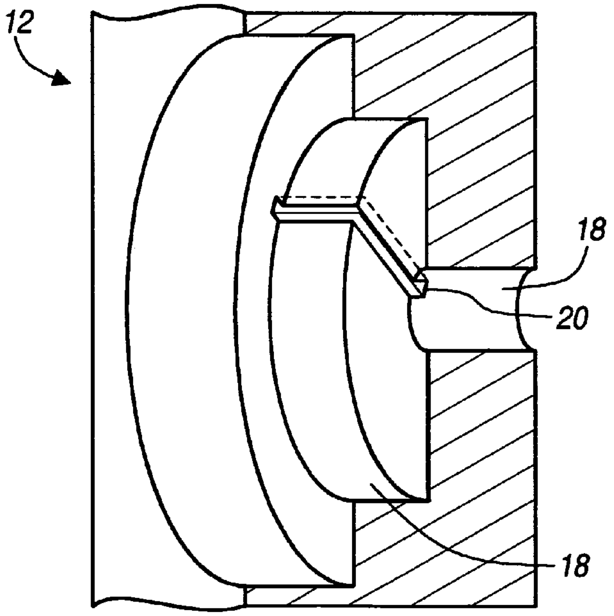
FIG. 7C is a partial broken away view of the second alternative valve body illustrated in FIGS. 7A and 7B, in accordance with a fourth alternative embodiment of the present invention.

In a still further alternate embodiment of the present invention, the bypass port 20 can be configured into a surface (e.g., interior) of the throttle body 12, as generally shown in FIGS. 7A-7C.

Thus, the several configurations that the bypass port 20 can be incorporated into the various components of the valve body 10 are shown in FIGS. 8-11.

Figure 8:
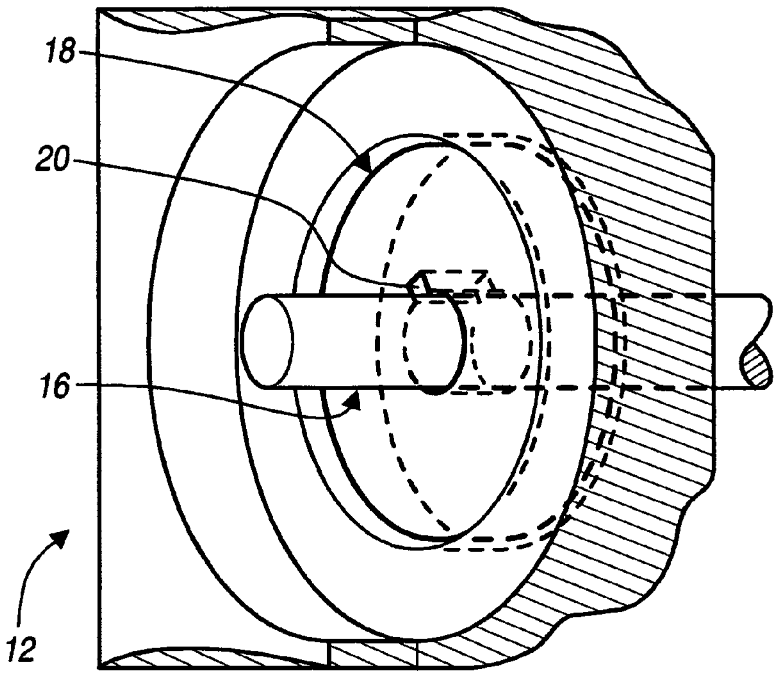
FIG. 8 is a partial broken away view of a third alternative valve body, in accordance with a fifth alternative embodiment of the present invention.

In FIG. 8, the bypass port 20 is incorporated into an interior surface of the bearing 18, as previously depicted in FIGS. 4A-4C. In this manner, the high-pressure side 22A can communicate with the low-pressure side 24A, without harming or causing damage to the bearing 18 and/or shaft 16 (e.g., contamination or loss of lubricant).

Figure 9:
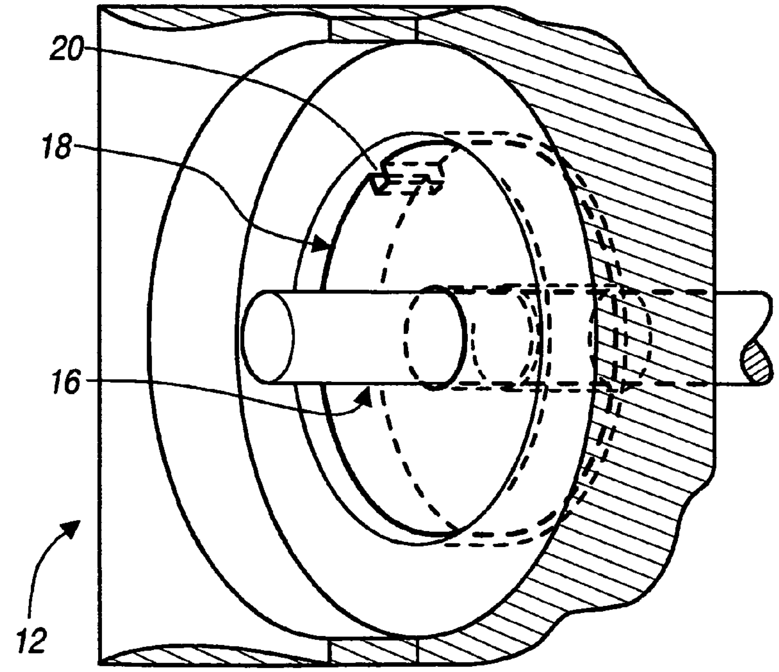
FIG. 9 is a partial broken away view of a fourth alternative valve body, in accordance with a sixth alternative embodiment of the present invention.

In FIG. 9, the bypass port 20 is incorporated into an exterior surface of the bearing 18. In this manner, the high-pressure side 22A can communicate with the low-pressure side 24A, without harming or causing damage to the bearing 18 and/or shaft 16 (e.g., contamination or loss of lubricant).

Figure 10:
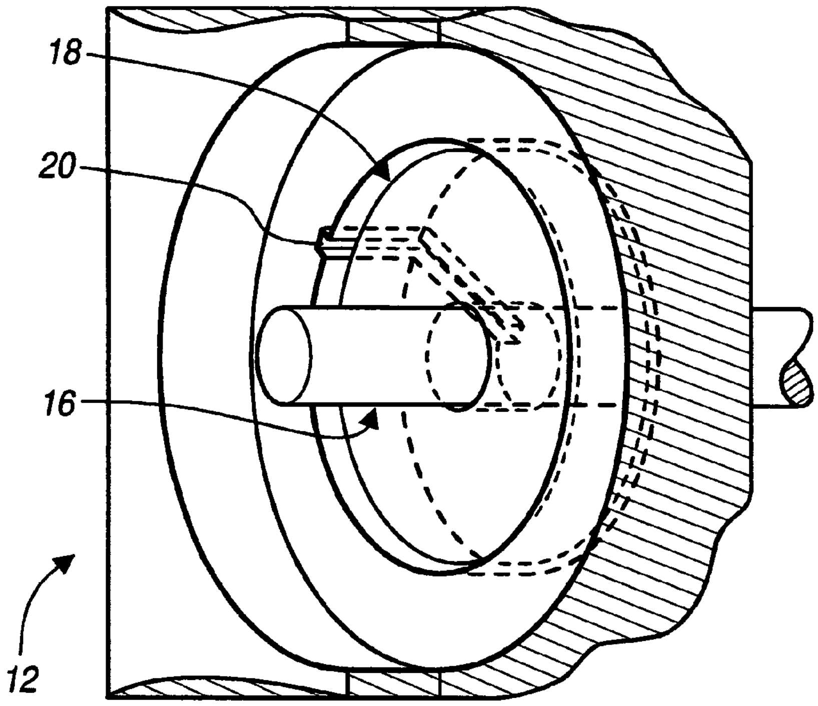
FIG. 10 is a partial broken away view of a fifth alternative valve body, in accordance with a seventh alternative embodiment of the present invention.

In FIG. 10, the bypass port 20 is incorporated into a surface of the throttle body 12. In this manner, the high-pressure side 22A can communicate with the low-pressure side 24A, without harming or causing damage to the bearing 18 and/or shaft 16 (e.g., contamination or loss of lubricant).

Figure 11:
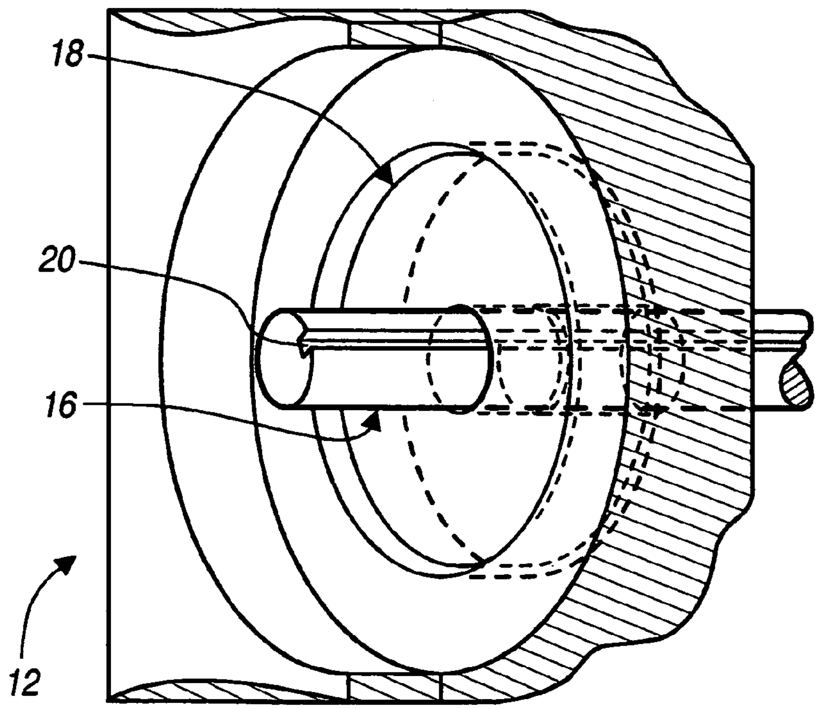
FIG. 11 is a partial broken away view of a sixth alternative valve body, in accordance with an eighth alternative embodiment of the present invention.

In FIG. 11, the bypass port 20 is incorporated into an exterior surface of the shaft 16. In this manner, the high-pressure side 22A can communicate with the low-pressure side 24A, without harming or causing damage to the bearing 18 and/or shaft 16 (e.g., contamination or loss of lubricant).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of pressure balancing across a bearing adjacent to a pressure differential, the pressure differential including a first pressure side on a first side of said bearing and a second pressure side on a second side of said bearing, comprising:

providing a bypass port around said bearing for allowing a fluid flow from the first pressure side to the second pressure side, wherein said bypass port is configured in said bearing and provides a passage around an outer periphery of said bearing.

2. The invention according to claim 1, wherein said passage is milled into said bearing.

3. The invention according to claim 1, wherein said passage is molded into said bearing.

4. A method of pressure balancing across a bearing adjacent to a pressure differential, the pressure differential including a first pressure side on a first side of said bearing and a second pressure side on a second side of said bearing, comprising:

providing a bypass port around said bearing for allowing a fluid flow from the first pressure side to the second pressure side; and providing a valve body including a selectively operable valve for metering a fluid flow, said bearing cooperating with said valve body.

5. The invention according to claim 4, wherein the first pressure side is a high-pressure side.

6. The invention according to claim 4, wherein the second pressure side is a low-pressure side.

7. The invention according to claim 4, wherein said valve body is a throttle body of a fluid flow metering system of an engine.

8. The invention according to claim 4, wherein said valve body is a throttle body of a vehicle.

9. The invention according to claim 4, wherein said bearing is selected from the group consisting of a ball bearing, needle bearing, bushing, and combinations thereof.

10. The invention according to claim 4, further comprising a rotational shaft, said shaft rotationally cooperating with said valve body by way of said bearing.

11. The invention according to claim 10, wherein said bypass port is configured in said shaft and provides a passage around an inner periphery of said bearing.

12. The invention according to claim 10, wherein said passage is milled into said shaft.

13. The invention according to claim 10, wherein said passage is molded into said shaft.

14. The invention according to claim 4, wherein said bypass port is configured in said valve body and provides a passage around an outer periphery of said bearing.

15. The invention according to claim 14, wherein said passage is milled into said valve body.

16. The invention according to claim 14, wherein said passage is molded into said valve body.

17. The invention according to claim 4, wherein said bypass port is configured in said bearing and provides a passage around an inner periphery of said bearing.

18. The invention according to claim 17, wherein said passage is milled into said bearing.

19. The invention according to claim 17, wherein said passage is molded into said bearing.

20. A method of pressure balancing across a bearing adjacent to a valve having a high-pressure side on a first side of said bearing and a low-pressure side on a second side of said bearing, comprising:

providing a valve body including a valve on a rotational shaft for metering flow by rotating said shaft with respect to said valve body, said shaft being rotationally connected to said valve body by way of a bearing; and providing a bypass port between said bearing and said valve body for allowing a flow from said high-pressure side to said low-pressure side.

21. The invention according to claim 20, wherein said valve body is a throttle body of a vehicle.

22. The invention according to claim 20, wherein said bypass port communicates to the shaft on a first side of said bearing and on a second side of said bearing.

23. The invention according to claim 20, wherein said bypass port is configured to communicate between an intake bore and a throttle control chamber.

24. The invention according to claim 20, wherein said bearing is selected from the group consisting of a ball bearing, needle bearing, bushing, and combinations thereof.

25. The invention according to claim 20, wherein said bypass port is configured in said valve body and provides a passage around an inner periphery of said bearing.

26. The invention according to claim 25, wherein said passage is milled into said valve body.

27. The invention according to claim 25, wherein said passage is molded into said valve body.

28. The invention according to claim 25, wherein said passage is configured in said outer periphery of said bearing.

29. A method of pressure balancing across a bearing adjacent to a valve having a high-pressure side on a first side of said bearing and a low-pressure side on a second side of said bearing, comprising:

providing a valve body including a valve on a rotational shaft for metering flow by rotating said shaft with respect to said valve body, said shaft being rotationally connected to said valve body by way of a bearing; and providing a bypass port between said bearing and said valve body for allowing a flow from said high-pressure side to said low-pressure side;

wherein said bypass port communicates to the shaft on a first side of said bearing and on a second side of said bearing.

30. The invention according to claim 29, wherein said valve body is a throttle body of a vehicle.

31. The invention according to claim 29, wherein said bypass port is configured to communicate between an intake bore and a throttle control chamber.

32. The invention according to claim 29, wherein said bearing is selected from the group consisting of a ball bearing, needle bearing, bushing, and combinations thereof.

33. The invention according to claim 29, wherein said bypass port is configured in said valve body and provides a passage around an inner periphery of said bearing.

34. The invention according to claim 33, wherein said passage is milled into said valve body.

35. The invention according to claim 33, wherein said passage is molded into said valve body.

36. The invention according to claim 33, wherein said passage is configured in said outer periphery of said bearing.

37. A throttle body for an engine, wherein a pressure differential is present in proximity to the throttle body, the pressure differential including a first pressure side and a second pressure side, comprising:

a bearing cooperating with said valve body; and a bypass port around said bearing for allowing a fluid flow from the first pressure side to the second pressure side.

38. The invention according to claim 37, further comprising a valve body including a selectively operable valve for metering a fluid flow.

39. The invention according to claim 37, wherein the first pressure side is a high-pressure side.

40. The invention according to claim 37, wherein the second pressure side is a low-pressure side.

41. The invention according to claim 37, wherein said bypass port is configured in said shaft and provides a passage around an inner periphery of said bearing.

42. The invention according to claim 37, wherein said bearing is selected from the group consisting of a ball bearing, needle bearing, bushing, and combinations thereof.

43. The invention according to claim 37, further comprising a rotational shaft, said shaft rotationally cooperating with said valve body by way of said bearing.

44. The invention according to claim 43, wherein said passage is milled into said shaft.

45. The invention according to claim 43, wherein said passage is molded into said shaft.

46. The invention according to claim 37, wherein said bypass port is configured in said valve body and provides a passage around an outer periphery of said bearing.

47. The invention according to claim 46, wherein said passage is milled into said valve body.

48. The invention according to claim 46, wherein said passage is molded into said valve body.

49. The invention according to claim 37, wherein said bypass port is configured in said bearing and provides a passage around an outer periphery of said bearing.

50. The invention according to claim 49, wherein said passage is milled into said bearing.

51. The invention according to claim 49, wherein said passage is molded into said bearing.

52. The invention according to claim 37, wherein said bypass port is configured in said bearing and provides a passage around an inner periphery of said bearing.

53. The invention according to claim 52, wherein said passage is milled into said bearing.

54. The invention according to claim 52, wherein said passage is molded into said bearing.

55. A throttle body for an engine, comprising:

a body portion including an air intake portion;

a butterfly valve configured to meter air through said air intake portion;

said butterfly valve attached to a shaft which is configured to rotate said body portion;

said shaft being rotationally coupled with a bearing in said body portion, said bearing being fit into a cavity in said body portion; and surfaces for forming a port bypassing said bearing between a differential pressure zone.

56. The invention according to claim 55, wherein the differential pressure is defined axially along said shaft.

57. The invention according to claim 55, wherein the differential pressure is between said air intake portion and a control portion of said body portion.

58. The invention according to claim 55, wherein a passage is formed around an outside periphery of said bearing for allowing flow past said bearing in an axial direction of said shaft.

59. The invention according to claim 55, wherein said body portion includes a high-pressure portion on a first side of said body portion and a low-pressure portion on a second side of said body portion in said air intake portion whereby a passage is provided therebetween, wherein said passage communicates with either said high-pressure side or said low-pressure side of said air intake portion.

60. The invention according to claim 55, wherein said bearing is selected from the group consisting of a ball bearing, needle bearing, bushing, and combinations thereof.

61. A throttle body for an engine, comprising:

a body portion including an air intake portion;

a butterfly valve configured to meter air through said air intake portion;

said butterfly valve attached to a shaft which is configured to rotate said body portion;

said shaft being rotationally coupled with a bearing in said body portion, said bearing being fit into a cavity in said body portion; and surfaces for forming a port bypassing said bearing between a differential pressure zone;

wherein said body portion includes a high-pressure portion on a first side of said body portion and a low-pressure portion on a second side of said body portion in said air intake portion whereby a passage is provided therebetween, wherein said passage communicates with either said high-pressure side or said low-pressure side of said air intake portion.

62. The invention according to claim 61, wherein the differential pressure is defined axially along said shaft.

63. The invention according to claim 61, wherein the differential pressure is between said air intake portion and a control portion of said body portion.

64. The invention according to claim 61, wherein the passage is formed around an outside periphery of said bearing for allowing flow past said bearing in an axial direction of said shaft.

65. The invention according to claim 61, wherein said bearing is selected from the group consisting of a ball bearing, needle bearing, bushing, and combinations thereof.

* * * * *